US009695886B2

(12) United States Patent
Swaminathan et al.

(10) Patent No.: US 9,695,886 B2
(45) Date of Patent: Jul. 4, 2017

(54) CLUTCH HOUSING WITH INTEGRATED HYDRAULIC LINE

(71) Applicant: FORD GLOBAL TECHNOLOGIES, LLC, Dearborn, MI (US)

(72) Inventors: Ashok Swaminathan, Ramsden Heath (GB); Martin J. Raper, Braintree (GB); Stephen K. Miles, Brentwood (GB); Duncan Metcalfe, Hadleigh (GB); Burcu Guleryuz, Istanbul (TR)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 79 days.

(21) Appl. No.: 14/687,044

(22) Filed: Apr. 15, 2015

(65) Prior Publication Data

US 2015/0300426 A1 Oct. 22, 2015

(30) Foreign Application Priority Data

Apr. 22, 2014 (GB) .................................. 1407057.7

(51) Int. Cl.
*F16D 25/08* (2006.01)
*F16D 25/12* (2006.01)
*F16D 48/02* (2006.01)

(52) U.S. Cl.
CPC .......... *F16D 48/02* (2013.01); *F16D 25/083* (2013.01); *F16D 25/123* (2013.01); *F16D 2048/0224* (2013.01); *F16D 2300/0214* (2013.01); *F16D 2300/26* (2013.01)

(58) Field of Classification Search
CPC .. F16D 25/08; F16D 2025/081; F16D 25/082; F16D 25/083; F16D 25/087; F16D 25/12; F16D 25/123; F16D 48/02; F16D 2048/0224; F16D 2300/0214; F16D 2300/26

See application file for complete search history.

(56) References Cited

U.S. PATENT DOCUMENTS

| 3,687,253 A | * | 8/1972 | Bjorklund | F16D 25/087 192/113.34 |
| 4,684,003 A | * | 8/1987 | Leigh-Monstevens | F16D 25/12 192/85.51 |
| 4,716,732 A | * | 1/1988 | Tordoff | B60T 11/30 60/546 |

FOREIGN PATENT DOCUMENTS

| EP | 0146283 A1 | 6/1985 |
| EP | 0718517 A1 | 6/1996 |
| EP | 1255054 A1 | 11/2002 |

* cited by examiner

*Primary Examiner* — Richard Lorence
(74) *Attorney, Agent, or Firm* — James Dottavio; MacMillan, Sobanski & Todd, LLC

(57) ABSTRACT

A clutch housing for a clutch assembly of a vehicle, the clutch housing comprising a fluid pathway at least partially disposed within a wall of the clutch housing, the fluid pathway forming at least a portion of a fluid line between a clutch slave cylinder and a clutch master cylinder, the fluid line being configured to transfer hydraulic fluid between the clutch slave cylinder and the clutch master cylinder.

20 Claims, 4 Drawing Sheets

CLUTCH HOUSING WITH INTEGRATED HYDRAULIC LINE

BACKGROUND OF INVENTION

This disclosure relates to a clutch housing for a clutch assembly of a vehicle, and in particular, but not exclusively, relates to a clutch housing having an integral fluid pathway at least partially disposed within a wall of the clutch housing.

In a hydraulic system for a clutch of a vehicle, it is common to use a master cylinder and slave cylinder arrangement to actuate the clutch. The clutch slave cylinder is connected to the master cylinder by a hydraulic fluid line such that a hydraulic pressure in the master cylinder is transferred to the clutch slave cylinder to actuate the clutch.

In modern vehicles, the clutch slave cylinder may be disposed within a clutch housing, which is often referred to as a bell housing. This is advantageous as it removes the need for a mechanical connection, such as a clutch fork or a push rod, to pass through an opening in a wall of the clutch housing. However, for slave cylinders that are mounted inside the clutch housing, the hydraulic fluid must be transferred from the master cylinder to the slave cylinder across the wall of the clutch housing.

It is known to connect the master cylinder to the slave cylinder using flexible and/or rigid fluid lines, for example rubber hoses and/or plastic pipes, that pass through openings in the clutch housing when assembled with the clutch housing. However, owing to the high operating temperatures of the clutch, hydraulic fluid lines that pass though the clutch housing may be prone to failure, which results in an inability to actuate the clutch and/or hydraulic fluid leaking into the clutch housing. Furthermore, the volumetric efficiency of the clutch slave cylinder decreases with an increase in operating temperature of the hydraulic fluid.

It is desirable, therefore, to mitigate the risk of failure of the hydraulic fluid lines and hydraulic fluid leaking into the clutch housing. It is also desirable to maintain the temperature of the hydraulic fluid below the operating temperatures of the clutch.

SUMMARY OF INVENTION

According to an aspect of the present invention there is provided a clutch housing for a clutch assembly of a vehicle, the clutch housing comprising a fluid pathway at least partially disposed within a wall of the clutch housing, the fluid pathway forming at least a portion of a fluid line between a clutch slave cylinder and a clutch master cylinder, the fluid line being configured to transfer hydraulic fluid between the clutch slave cylinder and the clutch master cylinder.

The clutch housing may comprise a bell housing configured to at least partially house a clutch, a flywheel and/or the clutch slave cylinder of the vehicle. The clutch housing may be configured to connect an engine block to a transmission. The clutch housing may be configured to at least partially house the transmission. The fluid line may extend through the engine block. The fluid line may extend through a transmission housing.

The wall of the clutch housing may comprise an outer surface configured to be in fluidic contact with a transmission fluid of a transmission of the vehicle. Heat may thus be transferred between the hydraulic fluid and the transmission fluid across the wall of the clutch housing. The wall of the clutch housing may have a thickness of approximately 5 mm or less between the fluid pathway and the outer surface of the clutch housing. The fluid pathway may be configured such that the distance between the hydraulic fluid in the fluid pathway and the environment external to the clutch housing is approximately 5 mm or less. The fluid pathway may be configured such that the distance between the hydraulic fluid in the fluid pathway and the transmission fluid adjacent to a surface of the clutch housing is approximately 5 mm or less.

The fluid pathway may be configured to connect an opening on an outer surface of the clutch housing to an opening on an inner surface of the clutch housing. The opening on the inner surface of the clutch housing may be disposed above a longitudinal axis of the clutch slave cylinder in an installed configuration. The opening on the inner surface of the clutch housing may be disposed radially from a longitudinal axis of the clutch slave cylinder in an installed configuration within a range of angles 0° to 90° from horizontal, for example a range of angles 30° to 60° from horizontal. The opening on the inner surface of the clutch housing may be disposed radially from a longitudinal axis of the clutch slave cylinder in an installed configuration at an angle of approximately 45° from horizontal. The opening on the inner surface of the clutch housing may be disposed radially from a longitudinal axis of the clutch slave cylinder in an installed configuration at an angle of approximately 90° from horizontal.

The fluid pathway may be orientated such that air trapped in the clutch slave cylinder may escape along the fluid line to the clutch master cylinder. The fluid pathway may be routed within the wall of the clutch housing, for example, such that air trapped in a hydraulic chamber of the clutch slave cylinder may escape along the fluid pathway towards the clutch master cylinder. The fluid pathway may extend in a direction with at least a component in a radial direction relative to the longitudinal axis of the clutch slave cylinder. The fluid line may be configured such that there is a positive inclination of the fluid line from the clutch slave cylinder to the clutch master cylinder along the length of the fluid line. The fluid line may be configured such that air escapes directly from the clutch slave cylinder to the clutch master cylinder. The clutch master cylinder may comprise a bleed valve. The fluid line may comprise a bleed valve.

A first connector, for example a rigid hydraulic coupling, may connect the fluid pathway to a hydraulic chamber of the clutch slave cylinder. The first connector may be configured to directly connect to the clutch slave cylinder. A longitudinal axis of the first connector may be parallel to the longitudinal axis of the clutch slave cylinder such that the clutch slave cylinder and the first connector may be installed to the clutch housing in a single assembly operation. The first connector may be integral to the clutch housing. The first connector may be integral to the clutch slave cylinder. A second connector, for example a rigid hydraulic coupling, may connect the fluid pathway to a hydraulic chamber of the clutch master cylinder. The second connector may be configured to be connected to a hose and/or a pipe, for example the second connector may be configured to be coupled to the hose and/or the pipe using a compression fitting.

According to another aspect of the present invention there is provided method of transferring hydraulic fluid for a clutch assembly of a vehicle, the clutch assembly comprising a clutch housing, wherein the clutch housing comprises a fluid pathway at least partially disposed within a wall of the clutch housing, the fluid pathway forming at least a portion of a fluid line between a clutch slave cylinder and a clutch master cylinder, the fluid line being configured to transfer hydraulic fluid between the clutch slave cylinder and the clutch master cylinder, the method comprising transferring the hydraulic fluid through the fluid pathway in the clutch housing.

An engine and/or motor vehicle may comprise one or more of the above-mentioned clutch housings.

BRIEF DESCRIPTION OF DRAWINGS

For a better understanding of the present disclosure, and to show more clearly how it may be carried into effect, reference will now be made, by way of example, to the accompanying drawings, in which.

DETAILED DESCRIPTION

Figure 1:
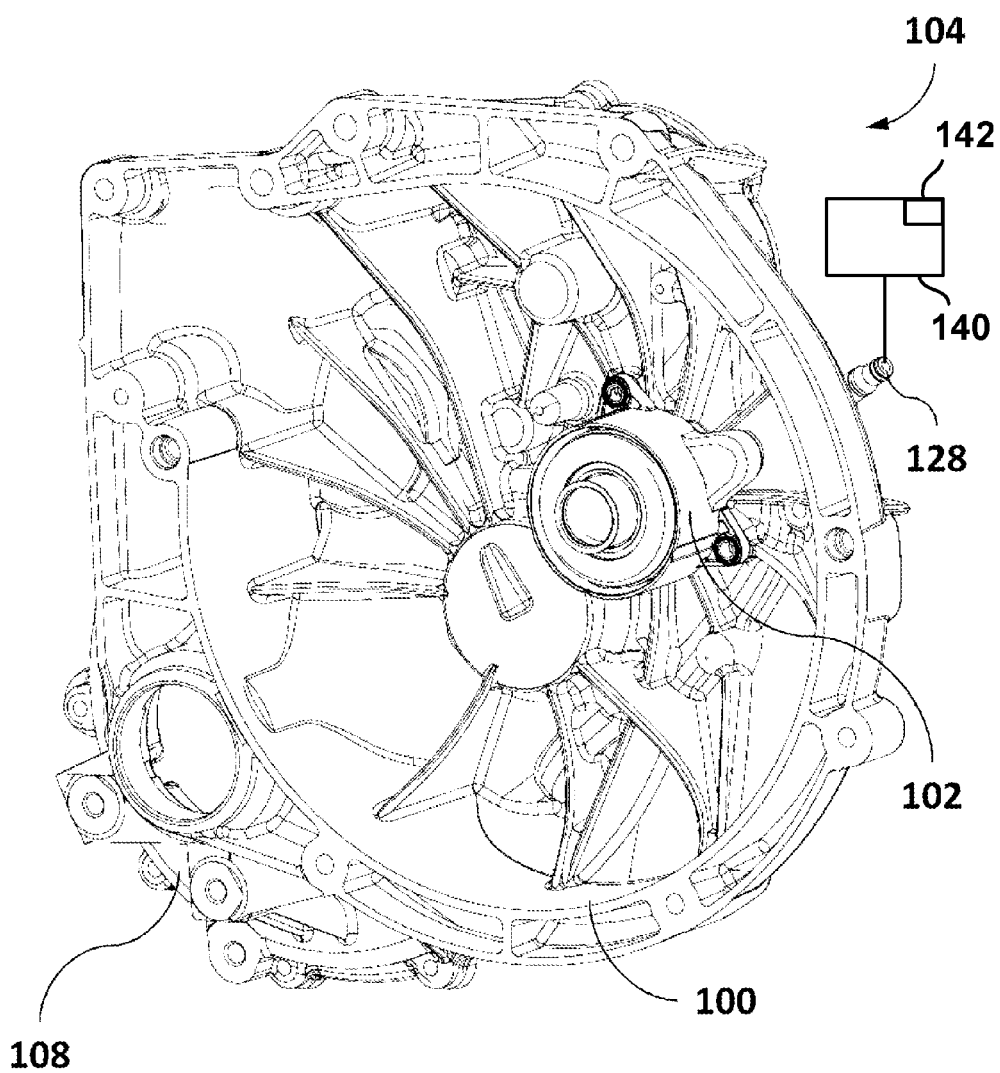
FIG. 1 shows an isometric view of a clutch housing and a clutch slave cylinder and a schematic representation of a clutch master cylinder connected via a hydraulic line to the clutch slave cylinder.
Figure 2:
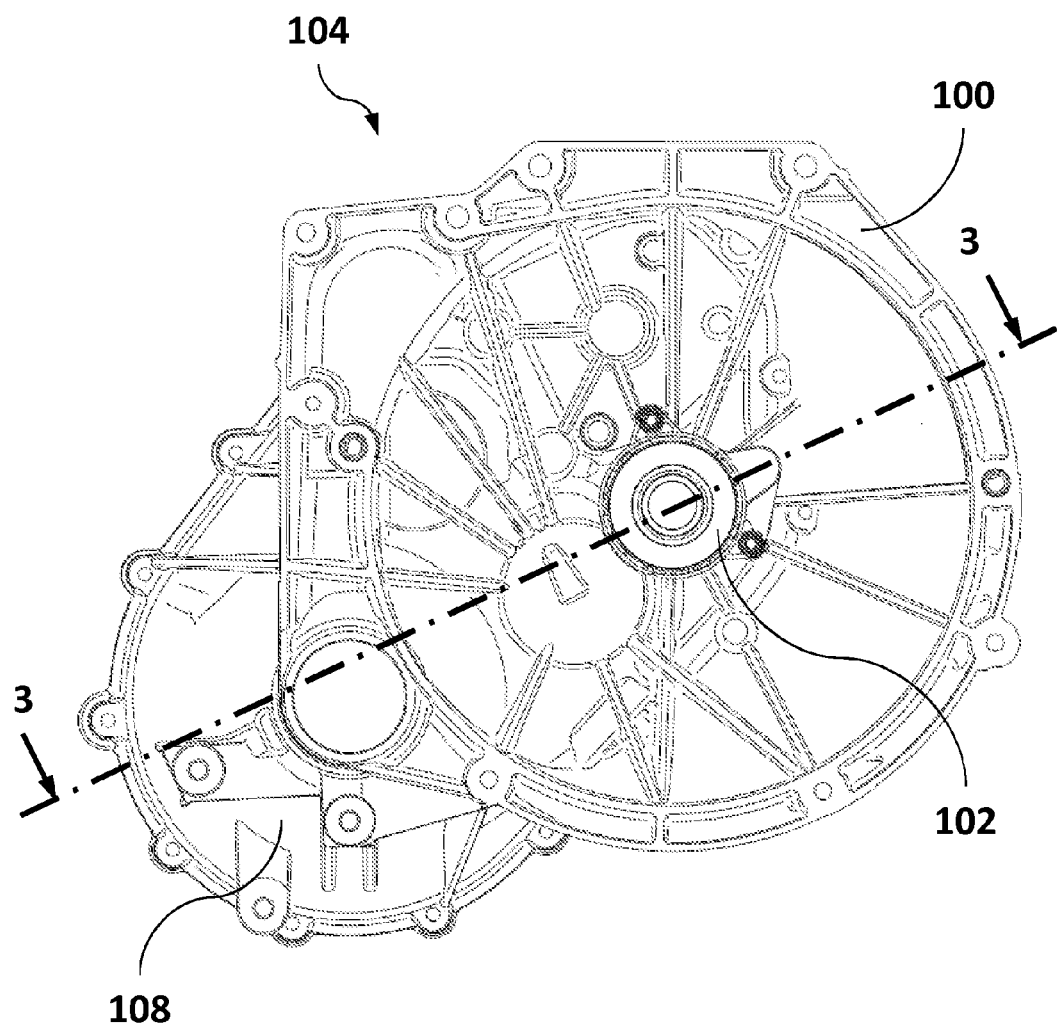
FIG. 2 shows an end on view of the clutch housing and the clutch slave cylinder.

FIGS. 1 and 2 show a clutch housing 100, for example a bell housing, and a clutch slave cylinder 102 for a clutch assembly 104 of a vehicle. The clutch housing 100 is configured to be connected to an engine block such that an output shaft of the engine, for example a crank shaft, extends from the engine into a cavity defined by the clutch housing 100. The output shaft may be coupled to one or more further components such as a flywheel, a clutch, and/or any other appropriate component that may be associated with the powertrain of the vehicle. The clutch housing 100 comprises an opening 106 (shown in FIGS. 3 and 4) through which an input shaft, for example a transmission input shaft, may extend.

In the example shown in FIGS. 1 and 2, the clutch housing 100 further comprises a transmission housing portion 108. It is appreciated, however, that the clutch housing 100 may be configured to house solely the clutch of the vehicle. It may also be appreciated that the clutch housing 100 may further comprise at least a portion of one or more ancillary devices, for example a starter motor housing and/or a pump housing. In another example, at least a portion of the clutch slave cylinder 102 may be integral with the clutch housing 100.

Figure 3:
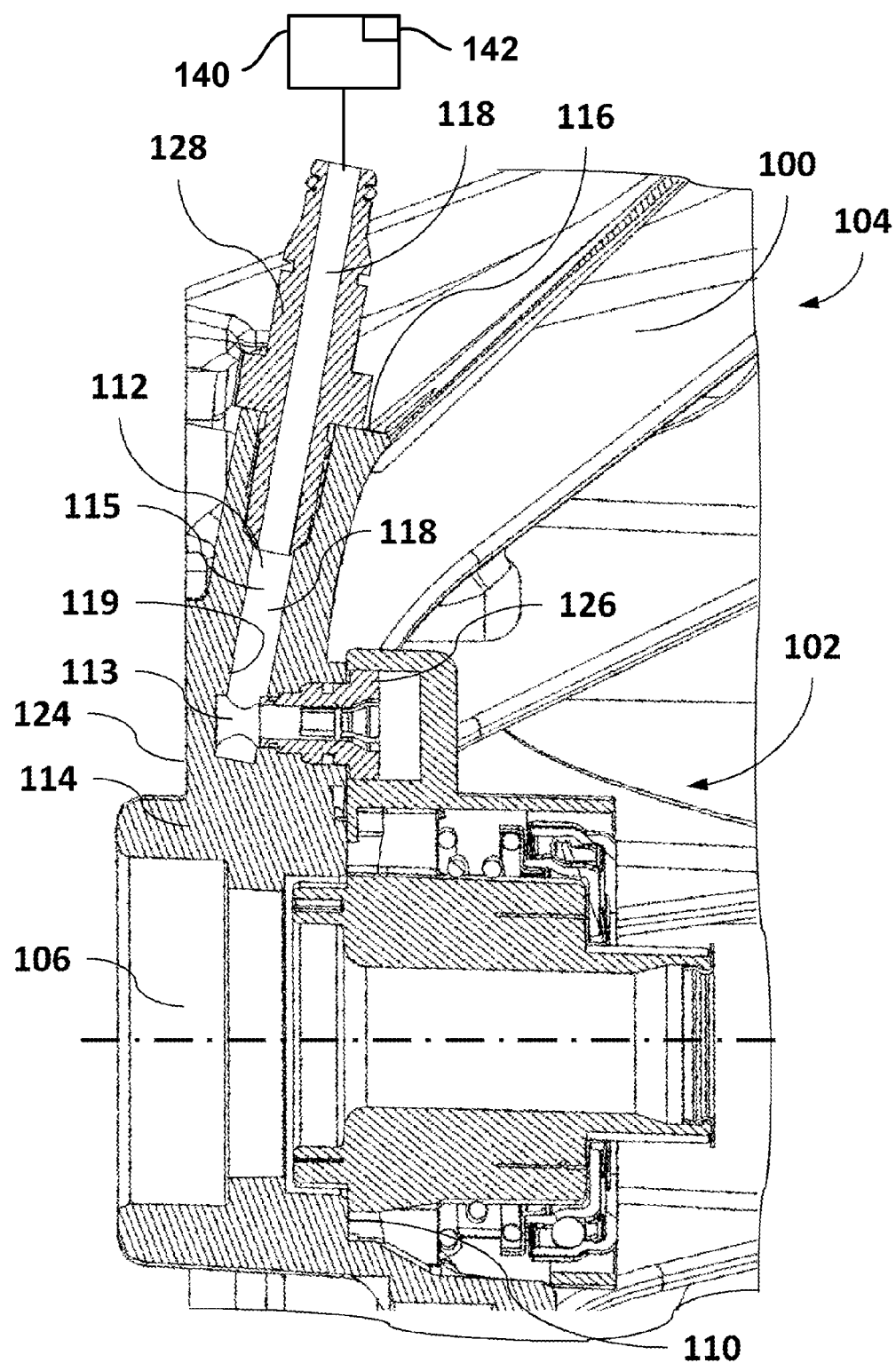
FIG. 3 shows cross section taken along line 3-3 of the clutch housing and the clutch slave cylinder of FIG. 2 and a schematic representation of a clutch master cylinder connected via a hydraulic line to the clutch slave cylinder.

The clutch housing 100 is configured such that clutch slave cylinder 102 is assembled against an inner surface 110 of the clutch housing 100, as shown in FIG. 3. In the example shown in FIGS. 1 to 3, the clutch slave cylinder 102 is assembled concentrically to the opening 106 in the clutch housing 100. In this manner the transmission input shaft, may extend from the clutch, through the clutch slave cylinder 102 and out of opening 106 in the clutch housing 100. In another example, the clutch slave cylinder 102 may be disposed radially to a longitudinal axis of the clutch housing 100 and/or the clutch may be actuated by one or more mechanical connections, for example a clutch fork and/or a push rod.

The clutch housing 100 comprises a fluid pathway 112 that is disposed within a wall 114 of the clutch housing 100. The fluid pathway 112 is configured to transfer hydraulic fluid between an outer surface 116 (FIGS. 3 and 4) and the inner surface 110 of the clutch housing 100. In this manner, the fluid pathway 112 forms a portion of a fluid line 118 configured to transfer hydraulic fluid between the clutch slave cylinder 102, which is inside the clutch housing 100, and a clutch master cylinder 140 which is shown schematically in FIGS. 1 and 3, and which is outside the clutch housing 100. The fluid pathway 112 is configured such that in use the hydraulic fluid is in direct contact with the clutch housing wall 114 in the region of the fluid pathway 112. In other words, the fluid pathway 112 comprises a channel in the clutch housing wall 114 through which the hydraulic fluid flows.

In one example, the fluid line 118 may be at least partially disposed within one or more components of the drivetrain and/or the vehicle. For example, the fluid line 118 may be routed through, along and/or parallel to a wall of the transmission housing, an engine block and/or a portion of the body of the vehicle.

Figure 4:
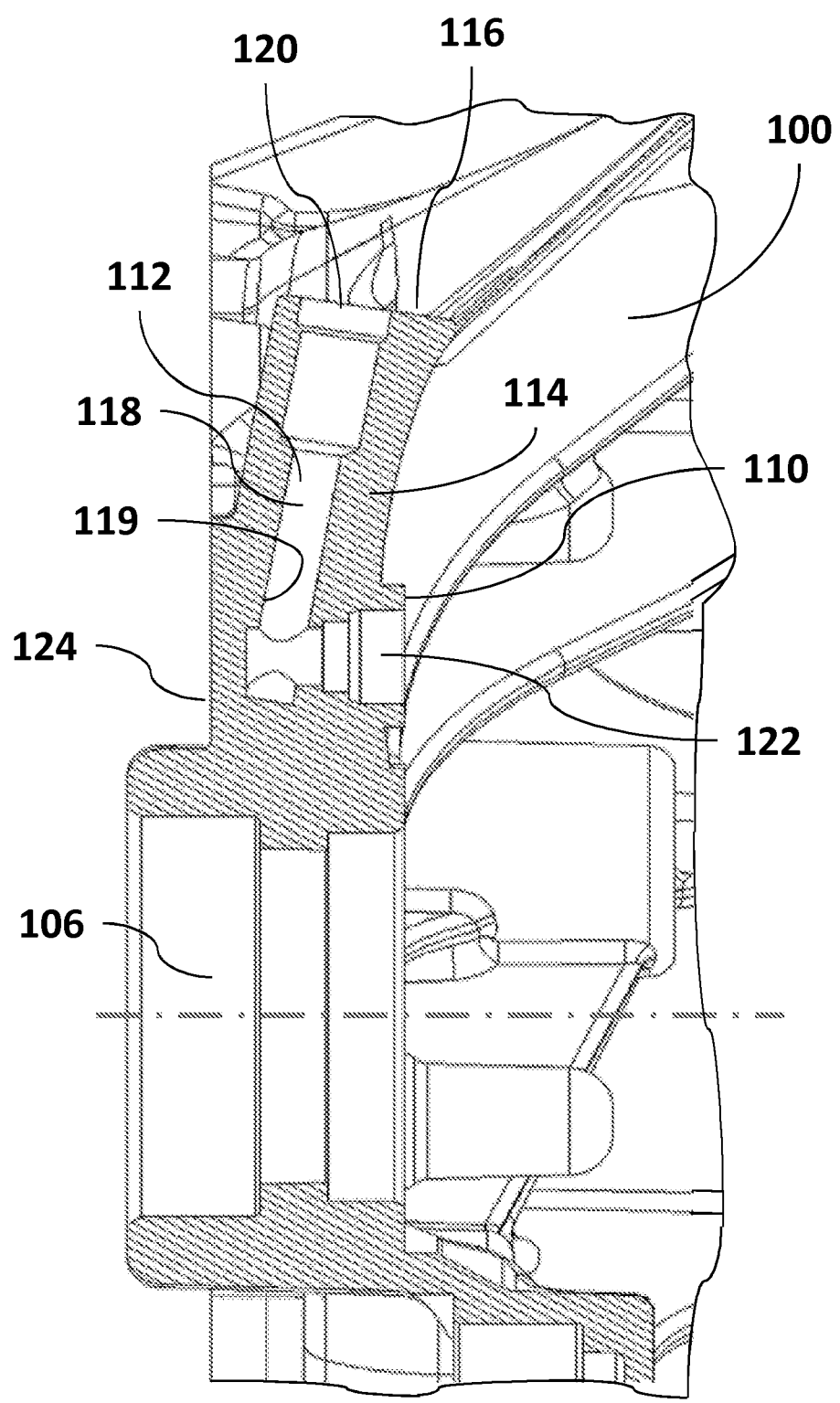
FIG. 4 shows a cross section similar to FIG. 3, but only showing the clutch housing.

FIG. 2 shows an end on view of the clutch housing 100 and the clutch slave cylinder 102. FIG. 3 shows the cross section 3-3 as indicated in FIG. 2, and FIG. 4 is a simplified view of cross section 3-3 that shows only the clutch housing 100. In the example shown in FIGS. 3 and 4, the fluid pathway 112 connects an opening 120 on the outer surface 116 of the clutch housing 100 to another opening 122 on the inner surface 110 of the clutch housing 100. The fluid pathway 112 comprises one or more bores, for example two intersecting bores, each of which extend into the wall 114 of the clutch housing 100. In the example of FIGS. 3 and 4, a first bore 113 extends from the inner surface 110 of the clutch housing 100 into the wall 114 in an axial direction. A second bore 115 extends from the outer surface 116 of the clutch housing 100 into the wall 114 in a direction with a radial component and an optional axial component. The first and second bores 113, 115 may, however, be of any configuration that results in the opening 120 and the opening 122 being in fluidic communication.

It may be appreciated that while such bores may be machined into the clutch housing 100 after the clutch housing 100 has been manufactured, for example by casting, the fluid pathway 112 may be formed by any appropriate method. In another example, the fluid pathway 112 may be complex and/or may be formed during the casting of the clutch housing 100, for example the fluid pathway 112 may be any form of bore and/or channel that is routed through, along and/or parallel to one or more walls 114 of the clutch housing 100.

During operation of the clutch, large amounts of heat may be generated due to the friction between the clutch plates. The temperature of the hydraulic fluid in the clutch slave cylinder 102 and the fluid line 118 may thus be affected by the operating temperature of the clutch. In some circumstances, for example under slip conditions, the operating temperature of the clutch may be sufficiently high to raise the temperature of the hydraulic fluid beyond a desired maximum operating temperature. Consequent to the rise in temperature of the hydraulic fluid, the volumetric efficiency of the clutch slave cylinder 102 may be reduced. In those circumstances where the temperature of the hydraulic fluid is greater than the clutch housing 102, the clutch housing 102 may serve as a heat sink, thereby removing heat from the hydraulic fluid, which is in contact with the walls 119 of the fluid pathway 112, and transferring the heat to the environment surrounding the clutch housing 102. It is advantageous therefore to route the fluid pathway 112 through the clutch housing 100 such that heat may be transferred from the warmer hydraulic fluid to the cooler environment surrounding the clutch housing 100.

In the example shown in FIGS. 3 and 4, the wall 114 is configured to at least partially form a dividing wall between the clutch and the transmission of the vehicle. The wall 114 comprises an outer surface 124 configured to be in fluid contact with a transmission fluid of the transmission of the vehicle. The fluid pathway 112 is at least partially disposed adjacent to the outer surface 124. During normal operation of the vehicle, the transmission fluid may be at a lower operating temperature than the hydraulic fluid, for example during periods of clutch slip. As a result, the configuration of the fluid pathway 112 permits heat to be transferred from the hydraulic fluid to the transmission fluid across the wall 114 of the clutch housing 100. In one example, the wall 114 of the clutch housing 100 has a thickness of 5 mm, for example approximately 5 mm or less, between the wall 119 of the fluid pathway 112 and the outer surface 124 of the clutch housing 100. The relatively short 5 mm distance between the wall 119 of the fluid pathway 112 and the outer surface 124 of the clutch housing 100 allows for efficient heat transfer through the wall 114.

As shown in the examples of FIGS. 3 and 4, the opening 122 on the inner surface 110 of the clutch housing 100 is disposed above a longitudinal axis of the clutch slave cylinder 102 when the clutch slave cylinder 102 is installed in the clutch housing 100. Hence, any air trapped in the clutch slave cylinder 102 is able to escape into the fluid pathway 112 through the opening 122. The fluid pathway 112 is configured to extend away from the clutch slave cylinder 102 such that air trapped in the clutch slave cylinder 102 may escape up the fluid pathway 112 towards the clutch master cylinder 140. For example, the fluid pathway 112 extends in a direction with at least a component in a radial direction relative to the longitudinal axis of the clutch slave cylinder 102. The fluid line 118 may be configured such that there is a positive inclination of the fluid line 118 from the clutch slave cylinder 102 to the clutch master cylinder 140 along the length of the fluid line 118. For example, the fluid line 118 may be configured such that there are no points of inflection or local maxima in the fluid line 118 between the clutch slave cylinder 102 and the clutch master cylinder 140. In this manner, air may escape from the clutch slave cylinder 102 to the clutch master cylinder 140 without becoming trapped at a local high point in the fluid line 118. The clutch master cylinder 140 may comprise a bleed valve 142, shown schematically in FIGS. 1 and 3, to bleed the air that has escaped from the clutch slave cylinder 102. In another example, a bleed valve may be disposed in the fluid line 118 at a point between the clutch slave cylinder 102 and the clutch master cylinder 140 such that the trapped air may be bled from the system before it enters the clutch master cylinder 140.

As shown by the orientation of the cross section 3-3 in FIG. 2, the opening 122 on the inner surface 110 of the clutch housing 100 is disposed radially from the longitudinal axis of the clutch slave cylinder 102 in an installed configuration at an angle of approximately 30° or 45° from horizontal. However, it may be appreciated that the opening 122 may be disposed radially from the longitudinal axis of the clutch slave cylinder 102 in an installed configuration within a range of angles of 0° to 90° from horizontal. In the example of FIGS. 3 and 4, the opening 122 is a circular opening, but may be of any form, for example the opening 122 may be an arcuate slot disposed over a range of angles. In this manner, the fluid pathway 112 is orientated such that any air trapped in the clutch slave cylinder 102 is able to escape from the clutch slave cylinder 102 through the opening 122, and along the fluid line 118 to the clutch master cylinder 140. The clutch slave cylinder 102 may be oriented such that air may not become trapped in the hydraulic chamber of the clutch slave cylinder 102.

In the example of FIG. 3, a first connector 126 connects the fluid pathway 112 to a hydraulic chamber of the clutch slave cylinder 102. The first connector 126 is a rigid connector and is configured to engage the opening 122 in the inner surface 110 of the clutch housing 100. The first connector 126 may be configured to connect directly to the clutch slave cylinder 102 such that the clutch slave cylinder 102 and the first connector 126 may be installed in a single assembly operation. In this manner, the clutch slave cylinder 102 may be easily installed to the clutch housing 100 and the fluidic connection between the fluid pathway 112 and the hydraulic chamber of the clutch slave cylinder 102 may be reliably maintained. In one example the first connector 126 may be integral to the clutch slave cylinder 102. In another example, the first connector 126 may be integral to the clutch housing 100.

FIG. 3 shows a second connector 128 that connects the fluid pathway 112 to a hydraulic chamber of the clutch master cylinder 140. The second connector 128 is a rigid connector and is configured to engage the opening 120 in the outer surface 116 of the clutch housing 100. It may be appreciated, however, that the second connector 128 may comprise a flexible portion, for example a rubber hose, and/or a rigid portion, for example a plastic or metal pipe, that extends from the clutch housing 100 up to the clutch master cylinder 140. The second connector 128 may be configured to connect directly to the clutch housing 100 and/or the clutch master cylinder 140. It may be appreciated, however, that the second connector 128 may be of any configuration that allows hydraulic fluid to be transferred from the fluid pathway 112 along the fluid line between the clutch slave cylinder 102 and the clutch master cylinder 140.

The present invention provides a method of transferring the hydraulic fluid for the clutch assembly of the vehicle, for example transferring hydraulic fluid between the clutch slave cylinder 102 and the clutch master cylinder, wherein the method comprises transferring the hydraulic fluid through the fluid pathway 112 in the clutch housing 100.

The present invention may also provide a method of cooling the hydraulic fluid for the clutch assembly of the vehicle by transferring the hydraulic fluid through the fluid pathway 112 in the clutch housing 100, the clutch housing 100 acting a heat sink to remove heat from the hydraulic fluid. In this manner, heat may be transferred from the hydraulic fluid to the external environment adjacent to the wall 114 of the clutch housing 100. The method of cooling the hydraulic fluid may further comprise transferring the hydraulic fluid through the fluid pathway 112 in the clutch housing 100, wherein the fluid pathway 112 is routed through the wall 114 such that the fluid pathway 112 is in close proximity to the surface 124 of the clutch housing, the surface 124 being configured to be in fluid contact with the transmission fluid of the transmission. In this manner, heat may be transferred from the hydraulic fluid to the transmission fluid across the wall 114 of the clutch housing 100.

It will be appreciated by those skilled in the art that although the invention has been described by way of example with reference to one or more examples, it is not limited to the disclosed examples and that alternative examples could be constructed without departing from the scope of the invention as defined by the appended claims.

The invention claimed is:

1. A clutch assembly, comprising:
a clutch housing having a wall, a fluid pathway at least partially formed by the wall, the fluid pathway forming at least a portion of a fluid line between a clutch slave cylinder within the housing and a clutch master cylinder outside the housing, the fluid line directing hydraulic fluid between the clutch slave cylinder and master cylinder; and wherein the wall adjacent to the fluid pathway comprises an outer surface configured to be in fluidic contact with a transmission fluid thereby allowing heat to be transferred between the hydraulic fluid in the fluid pathway and the transmission fluid through the wall.

2. The clutch assembly according to claim 1, wherein the fluid pathway connects an opening on the outer surface of the clutch housing to an opening on an inner surface of the clutch housing.

3. The clutch assembly according to claim 2, wherein the opening on the inner surface of the clutch housing is disposed above a longitudinal axis of the clutch slave cylinder in an installed configuration.

4. The clutch assembly according to claim 2, wherein the opening on the inner surface of the clutch housing is disposed radially from a longitudinal axis of the clutch slave cylinder in an installed configuration within a range of angles 30° to 60° from horizontal.

5. The clutch assembly according to claim 1, wherein the fluid pathway is orientated such that air in the clutch slave cylinder escapes along the fluid line to the clutch master cylinder.

6. The clutch assembly according to claim 5, wherein the fluid pathway extends in a direction with at least a component in a radial direction relative to a longitudinal axis of the clutch slave cylinder.

7. The clutch assembly according to claim 1, wherein the fluid line is configured such that there is a positive inclination of the fluid line from the clutch slave cylinder to the clutch master cylinder along the length of the fluid line.

8. The clutch assembly according to claim 1, including the clutch master cylinder, wherein the clutch master cylinder comprises a bleed valve.

9. The clutch assembly according to claim 1, including a first connector mounted to the clutch housing that connects the fluid pathway to a hydraulic chamber of the clutch slave cylinder.

10. The clutch assembly according to claim 9, wherein the first connector is configured to directly connect to the clutch slave cylinder.

11. The clutch assembly according to claim 9, including a second connector mounted to the clutch housing that connects the fluid pathway to a hydraulic chamber of the clutch master cylinder.

12. The clutch assembly according to claim 11, wherein the fluid line is configured such that there is a positive inclination of the fluid line from the clutch slave cylinder to the clutch master cylinder along the length of the fluid line.

13. The clutch assembly according to claim 1, including a connector mounted to the clutch housing that connects the fluid pathway to a hydraulic chamber of the clutch master cylinder.

14. The clutch assembly according to claim 1, wherein the wall of the clutch housing adjacent to the fluid pathway has a thickness of 5 mm or less between the fluid pathway and the outer surface of the clutch housing.

15. A method of transferring hydraulic fluid for a clutch assembly, the clutch assembly comprising a clutch housing, wherein the clutch housing comprises a fluid pathway at least partially disposed within a wall of the clutch housing, the fluid pathway forming at least a portion of a fluid line between a clutch slave cylinder and a clutch master cylinder, the fluid line being configured to transfer hydraulic fluid between the clutch slave cylinder and the clutch master cylinder, the method comprising:
transferring the hydraulic fluid through the fluid pathway in the clutch housing;
contacting transmission fluid against an outer surface of the wall adjacent to the fluid pathway in the clutch housing; and
transferring heat from the hydraulic fluid in the fluid pathway through the wall into the transmission fluid.

16. The method of claim 15 comprising:
wherein the fluid line is configured such that there is a positive inclination of the fluid line from the clutch slave cylinder to the clutch master cylinder along the length of the fluid line; and
air in the clutch slave cylinder floats upward through the fluid line to the clutch master cylinder.

17. A clutch assembly, comprising:
a clutch housing having a wall, a fluid pathway at least partially formed by the wall, the fluid pathway forming at least a portion of a fluid line between a clutch slave cylinder within the housing and a clutch master cylinder outside the housing, the fluid line directing hydraulic fluid between the clutch slave cylinder and master cylinder; wherein the fluid pathway connects an opening on an outer surface of the clutch housing to an opening on an inner surface of the clutch housing; and wherein the opening on the inner surface of the clutch housing is disposed radially from a longitudinal axis of the clutch slave cylinder in an installed configuration within a range of angles 30° to 60° from horizontal.

18. A clutch assembly, comprising:
a clutch housing having a wall, a fluid pathway formed by the wall and forming a portion of a fluid line between a clutch slave cylinder within the housing and a clutch master cylinder outside the housing, the fluid line directing fluid between the clutch slave cylinder and master cylinder; and
a connector mounted to the clutch housing, connecting the fluid pathway to a slave cylinder hydraulic chamber.

19. The clutch assembly according to claim 18, wherein the connector is configured to directly connect to the clutch slave cylinder.

20. The clutch assembly according to claim 18, including a second connector mounted to the clutch housing that connects the fluid pathway to a hydraulic chamber of the clutch master cylinder.

* * * * *